United States Patent
Lu et al.

(10) Patent No.: US 11,475,581 B2
(45) Date of Patent: Oct. 18, 2022

(54) DEPTH PROCESSOR

(71) Applicant: HIMAX TECHNOLOGIES LIMITED, Tainan (TW)

(72) Inventors: Hsueh-Tsung Lu, Tainan (TW); Ching-Wen Wang, Tainan (TW); Cheng-Che Tsai, Tainan (TW); Wu-Feng Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 9 days.

(21) Appl. No.: 17/203,768

(22) Filed: Mar. 17, 2021

(65) Prior Publication Data

US 2022/0301201 A1    Sep. 22, 2022

(51) Int. Cl.
*G06T 7/50* (2017.01)
*G06V 40/16* (2022.01)

(52) U.S. Cl.
CPC .............. *G06T 7/50* (2017.01); *G06V 40/161* (2022.01); *G06T 2207/30201* (2013.01)

(58) Field of Classification Search
CPC ............ G06T 7/50; G06T 2207/30201; G06V 40/161
See application file for complete search history.

(56) References Cited

U.S. PATENT DOCUMENTS

2019/0222769 A1\* 7/2019 Srivastava ........... H04N 5/2355
2019/0370947 A1\* 12/2019 Tsujita .................... G06T 5/009
2022/0076018 A1\* 3/2022 Geiss ..................... G06V 40/16

\* cited by examiner

*Primary Examiner* — Sam Bhattacharya
(74) *Attorney, Agent, or Firm* — JCIPRNET

(57) ABSTRACT

A depth processor including a region of interest determination circuit and a depth decoder is provided. The region of interest determination circuit is configured to determine a region of interest of an input image. The depth decoder is coupled to the region of interest determination circuit and configured to generate a depth map of the region of interest of the input image.

5 Claims, 2 Drawing Sheets

DEPTH PROCESSOR

BACKGROUND

Technical Field

The invention relates to a processor, more specifically, to a depth processor.

Description of Related Art

As an application of facial recognition system develops, various sensors for detecting three-dimensional images of faces are flourishing. Taking a structured light technology for example, structured lights are projected to an object by using a projector, and sensors detect a projection image. Therefore, a triangle geometry structure among the object, the projector and the sensors can be obtained, and further a depth map can be generated according to the triangle geometry structure and a deformation displacement of the projection image. In addition, time of flight or phase difference of an output light and a receiving light is also widely applied to the facial recognition system to calculate the depth map.

However, it may take a lot of operational time, power consumption and/or transmission bandwidth of a depth processor for calculating and generating a depth map of a whole input image.

SUMMARY

The invention is directed to a depth processor, wherein operational time, power consumption and/or transmission bandwidth can be reduced since only a region of interest (ROI) is processed to obtain a depth map of the region of interest.

An embodiment of the invention provides a depth processor including a ROI determination circuit and a depth decoder. The ROI determination circuit is configured to determine a ROI of an input image. The depth decoder is coupled to the ROI determination circuit and configured to generate a depth map of the ROI of the input image.

In an embodiment of the invention, the ROI determination circuit outputs a position information of the ROI of the input image to the depth decoder.

In an embodiment of the invention, the depth decoder only generates the depth map of the ROI of the input image according to the position information.

In an embodiment of the invention, the ROI of the input image comprises a face of a user.

In an embodiment of the invention, the ROI determination circuit determines the ROI of the input image according to a skin tone range.

In an embodiment of the invention, the input image is a two-dimensional image.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
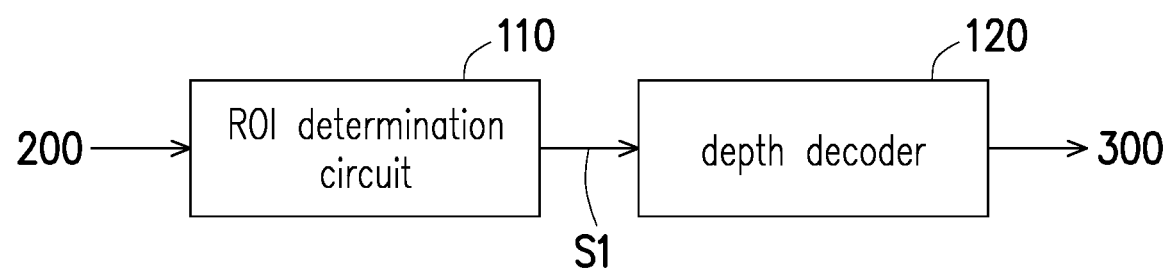
FIG. 1 is a block diagram illustrating a depth processor according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
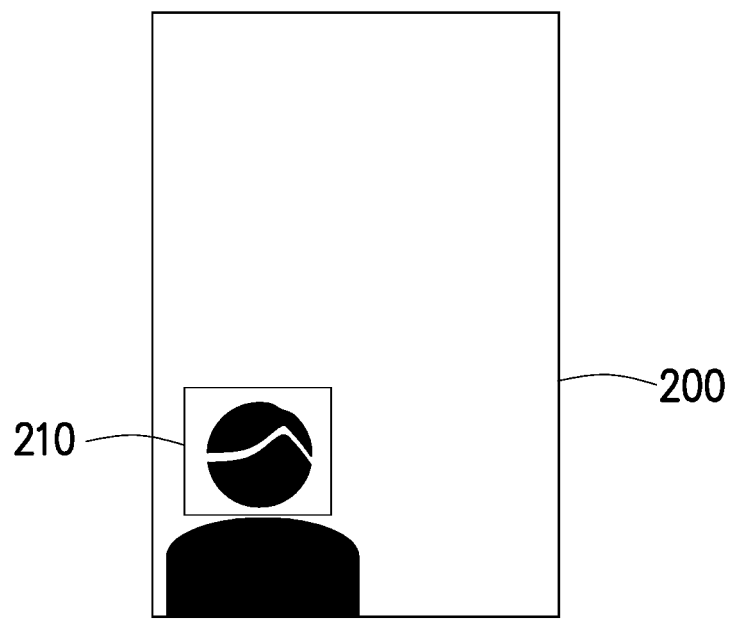
FIG. 2 is a schematic diagram illustrating an input image of FIG. 1 according to an embodiment of the invention.
Figure 3:
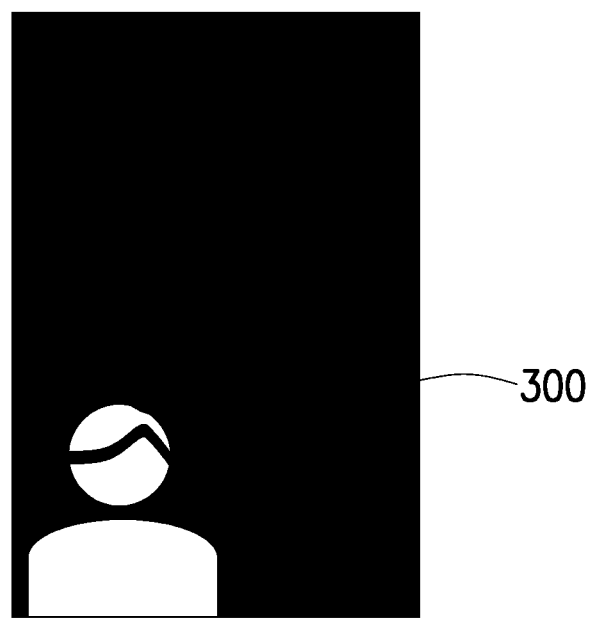
FIG. 3 is a schematic diagram illustrating a depth map of FIG. 1 according to an embodiment of the invention.

FIG. 1 is a block diagram illustrating a depth processor according to an embodiment of the invention. FIG. 2 is a schematic diagram illustrating an input image of FIG. 1 according to an embodiment of the invention. FIG. 3 is a schematic diagram illustrating a depth map of FIG. 1 according to an embodiment of the invention.

Referring to FIG. 1 and FIG. 2, the depth processor 100 is configured to receive the input image 200 from a camera and output the depth map 300 to a back-end system for facial recognition. In the present embodiment, the input image 200 is a two-dimensional image. The depth processor 100 includes a region of interest (ROI) determination circuit 110 and a depth decoder 120. The depth decoder 120 is coupled to the ROI determination circuit 110. The ROI determination circuit 110 is configured to determine a ROI 210 of the input image 200. The depth decoder 120 is configured to generate the depth map 300 of the ROI 210 of the input image 200. To reduce operational time, power consumption and/or transmission bandwidth of the depth processor 100, the depth decoder 110 may only calculate and generate the depth map 300 of the ROI 210 of the input image 200.

To be specific, the ROI determination circuit 110 receives the input image 200 from the camera and outputs a position information Si of the ROI 210 of the input image 200 to the depth decoder 120. In the present embodiment, the ROI 210 of the input image includes a face of a user. Accordingly, the ROI determination circuit 110 determines the ROI 210 of the input image 200 according to a skin tone range. For example, the skin tone range may indicate that the region includes a face of a user. The ROI determination circuit 110 can determines whether a certain region is within the skin tone range according to an image resolution, an image brightness, an image spectral distribution, an image discrepancy, an image relevancy, an image color depth, an image sharpness or an image refresh rate. Therefore, the ROI determination circuit 110 determines the region within the skin tone range as the ROI 210 of the input image 200. The depth decoder 110 may only calculate and generate the depth map 300 of the ROI 210 of the input image 200.

In the present embodiment, the circuit blocks of the depth processor 100 may be a hardware circuit designed through Hardware Description Language (HDL) or any other design methods for digital circuit well-known to persons with ordinary skill in the art and may be implemented in from of Field Programmable Gate Array (FPGA), Complex Programmable Logic Device (CPLD) or Application-specific Integrated Circuit (ASIC).

In summary, in the embodiments of the invention, the depth processor determines a ROI of an input image, and only calculates and generates the depth map 300 of the ROI of the input image to reduce operational time, power consumption and/or transmission bandwidth of the depth processor.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A depth processor, comprising:
   a region of interest (ROI) determination circuit, configured to determine a ROI of an input image; and
   a depth decoder, coupled to the ROI determination circuit and configured to generate a depth map of the ROI of the input image,
   wherein the ROI determination circuit outputs a position information of the ROI of the input image to the depth decoder.

2. The depth processor of claim 1, wherein the depth decoder only generates the depth map of the ROI of the input image according to the position information.

3. The depth processor of claim 1, wherein the ROI of the input image comprises a face of a user.

4. The depth processor of claim 1, wherein the ROI determination circuit determines the ROI of the input image according to a skin tone range.

5. The depth processor of claim 1, wherein the input image is a two-dimensional image.

\* \* \* \* \*